(12) United States Patent
Stein

(10) Patent No.: US 7,462,215 B2
(45) Date of Patent: Dec. 9, 2008

(54) VERY THIN PROFILE FILTER WITH LARGE FILTER MEDIA AREA

(75) Inventor: Myron Stein, Laguna Niguel, CA (US)

(73) Assignee: AirSept, Inc., Atlanta, GA (US)

( * ) Notice: Subject to any disclaimer, the term of this patent is extended or adjusted under 35 U.S.C. 154(b) by 430 days.

(21) Appl. No.: 11/150,488

(22) Filed: Jun. 10, 2005

(65) Prior Publication Data

US 2006/0277878 A1 Dec. 14, 2006

Related U.S. Application Data

(60) Provisional application No. 60/578,648, filed on Jun. 10, 2004.

(51) Int. Cl.
*B01D 46/00* (2006.01)

(52) U.S. Cl. ............... 55/385.3; 55/385.1; 55/495; 55/492; 55/503; 55/504; 62/118; 62/149; 417/313

(58) Field of Classification Search ............... 55/385.1, 55/484, 492, 500, 505, 510, 385.3, 495, 503, 55/504, 511; 417/313; 210/168, 171, 462; 62/118, 149
See application file for complete search history.

(56) References Cited

U.S. PATENT DOCUMENTS

| | | | | |
|---|---|---|---|---|
| 3,051,230 A | * | 8/1962 | Hart | 55/505 |
| 5,230,727 A | * | 7/1993 | Pound et al. | 55/492 |
| 5,562,427 A | | 10/1996 | Mangyo et al. | |
| 5,893,945 A | * | 4/1999 | Hunsinger et al. | 96/135 |
| 5,951,728 A | | 9/1999 | Hopson | |
| 6,044,649 A | | 4/2000 | Numoto et al. | |
| 6,189,333 B1 | | 2/2001 | Cummings et al. | |
| 6,422,830 B1 | | 7/2002 | Yamada et al. | |
| 6,579,351 B2 | | 6/2003 | Fisk et al. | |
| 6,669,451 B1 | | 12/2003 | Wall | |
| 6,793,702 B2 | * | 9/2004 | Eswarappa | 55/484 |

FOREIGN PATENT DOCUMENTS

| | | |
|---|---|---|
| DE | 003704458 A1 | 8/1988 |
| JP | 410216436 A | 8/1998 |
| JP | 411014204 A | 1/1999 |
| JP | 02002017834 A | 1/2002 |

* cited by examiner

*Primary Examiner*—Duane Smith
*Assistant Examiner*—Minh-Chau T. Pham
(74) *Attorney, Agent, or Firm*—Womble Carlyle Sandridge & Rice PLLC

(57) ABSTRACT

An extremely thin profile filter is sized and configured to be installed between tubing couplers of an automotive air conditioning system in regions of an engine compartment that are cramped or otherwise will not accommodate a longer in-line filter. The filter includes a thin flat filter housing formed from first and second thin shells joined together at opposed inside faces. Each shell is formed with a shallow well on its inside face and the wells align to define an interior camber within the filter housing. The outside opposing faces of the filter housing are configured to mate with corresponding sections of a tubing coupler so that the filter is installed by being sandwiched between the sections of the tubing coupler.

21 Claims, 6 Drawing Sheets

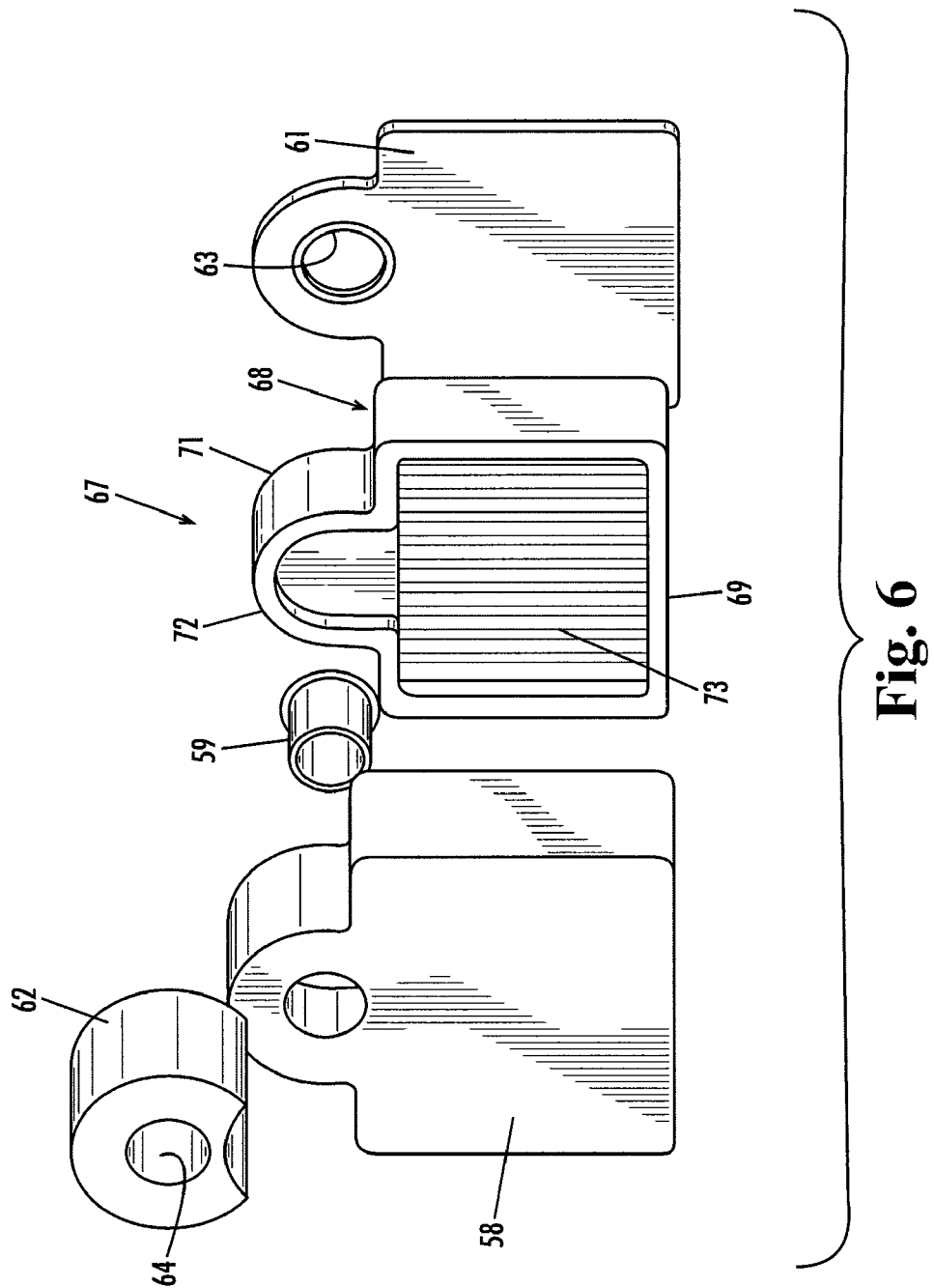

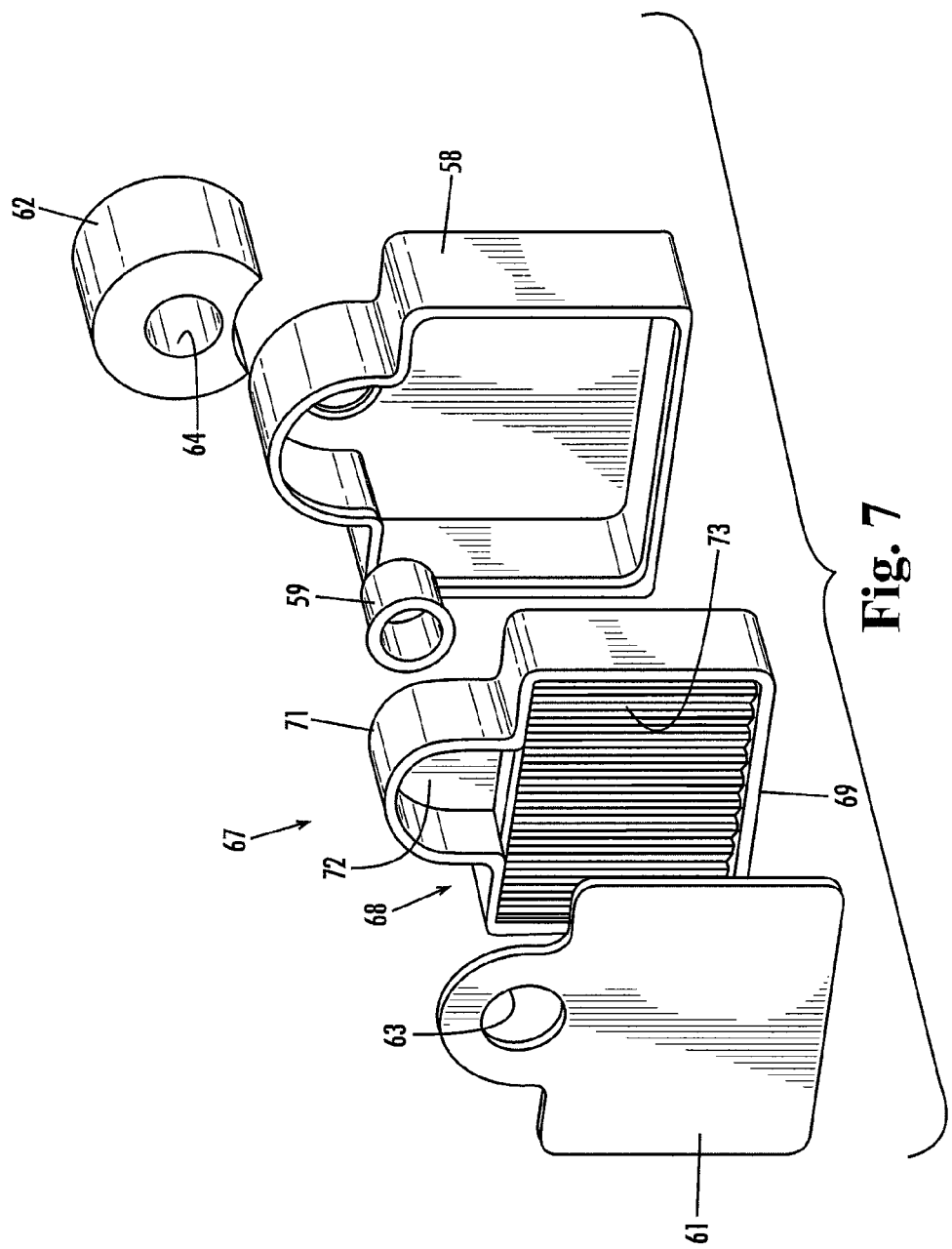

ial application Ser. No. 60/578,648 filed
VERY THIN PROFILE FILTER WITH LARGE FILTER MEDIA AREA

REFERENCE TO RELATED APPLICATION

Priority is hereby claimed to the benefit of the filing date of U.S. provisional patent application Ser. No. 60/578,648 filed on Jun. 10, 2004.

TECHNICAL FIELD

This invention relates generally to fluid filters and more particularly to fluid filters usable in cramped quarters such as in the engine compartment of an automobile.

BACKGROUND

Filters are used to clean and remove debris from a wide variety of automotive fluids. For example, oil filters filter engine oil, transmission filters filter automatic transmission fluid, and coolant filters filter engine coolant as it circulates through the engine. Filters also may be used to filter air conditioning refrigerant as it circulates into and/or out of the compressor of an automotive air conditioning system. In this regard, my previous U.S. Pat. No. 6,176,093 issued on Jan. 23, 2001 discloses an automotive air conditioning refrigerant filter and method wherein a thimble-shaped filter element is installed in an air conditioning compressor to trap debris that may be entrained in the refrigerant. The disclosure of this patent is hereby incorporated by reference.

A unique aluminum tubing coupler is used in many automotive air conditioning systems to couple together the ends of two pieces of aluminum tubing. Such a coupler is used, for instance, to couple the condenser unit of the air conditioning system in the refrigerant line from the compressor. A coupler is the ideal location in many instances where a refrigerant filter can be inserted in the refrigerant line because there is a natural break in the line at this location. However, the tubing couplers mentioned above often are located in tight or cramped quarters within an engine compartment such as, for instance, between the condenser unit and the firewall or within the radiator cowling. For this reason, it often is impossible to install a traditional in-line type filter unit in the refrigerant line because there simply is not enough space to accommodate such a filter unit. Smaller in-line filters may be selected to fit the space, but the correspondingly smaller area of filter media in these smaller filters generally is unacceptable because the filter clogs quickly and must be replaced often. Replacement is a problem in the cramped and sometimes inaccessible quarters in which the filters reside.

Thus, there is a need for an automotive air conditioning filter unit that can easily be installed in cramped and tight locations where tubing couplers of the system are located but that nevertheless provides a large filter media area that effectively filters for a long period of time without becoming clogged. It is to the provision of such a filter unit that the present invention is primarily directed.

SUMMARY OF THE INVENTION

Briefly described, the present invention, in a preferred embodiment thereof, is an extremely thin profile block filter unit designed to be installed in an automotive air conditioning system at locations of tube couplers. The filter unit has thin generally square or rectangular shells that fit together to form a thin rectangular housing defining a correspondingly thin rectangular interior chamber. An inlet port is formed on one shell and an outlet port is formed on the other shell. The inlet port of the filter unit matches the configuration of the female (or male as the case may be) portion of a tubing coupler and the outlet port matches the configuration of the male (or female as the case may be) portion of the tubing coupler. In this way, the filter unit can be sandwiched between the sections of a tubing coupler so that fluid flows through the interior chamber. When the filter housing is assembled, it is exceeding thin compared to traditional in-line filter units and easily fits in virtually any cramped or tight region of an engine compartment.

A large flat rectangular filter screen having a correspondingly large surface area is disposed in and spans the interior chamber of the housing. Air conditioning refrigerant that enters the housing through its inlet port encounters and passes through the filter screen prior to exiting the filter unit through its outlet port and is thereby filtered. As the filter screen becomes clogged at the location of the path of the fluid, the fluid simply spreads out laterally across the clogged portion of the screen until it encounters a clean region of the screen. It then passes through the clean region of the filter screen, is filtered, and moves out through the outlet port. Since the surface area of the filter screen is large and comparable to that of traditional in-line filters that otherwise might be used, the filter of this invention functions for long periods of time without becoming clogged. However, the thickness of the filter unit is only a fraction of the length of a comparable in-line filter and thus easily fits in a cramped area.

Thus, a filter unit is now provided that can be installed in automotive air conditioning systems in the extremely tight and cramped locations where tubing couplers are located but that nevertheless provides filter media with a large surface area comparable to much larger filters that will not fit in such regions. These and other features, objects, and advantages of the filter of the present invention will become more apparent upon review of the detailed description set forth below taken in conjunction with the accompanying drawing figures, which are briefly described as follows.

BRIEF DESCRIPTION OF THE DRAWINGS

FIG. 6 is an exploded perspective view of the filter of FIG. 4 as seen from the outlet side thereof.

FIG. 7 is and exploded perspective view of the filter of FIG. 4 as seen from the inlet side thereof.

DETAILED DESCRIPTION OF THE PREFERRED EMBODIMENTS

Figure 1:
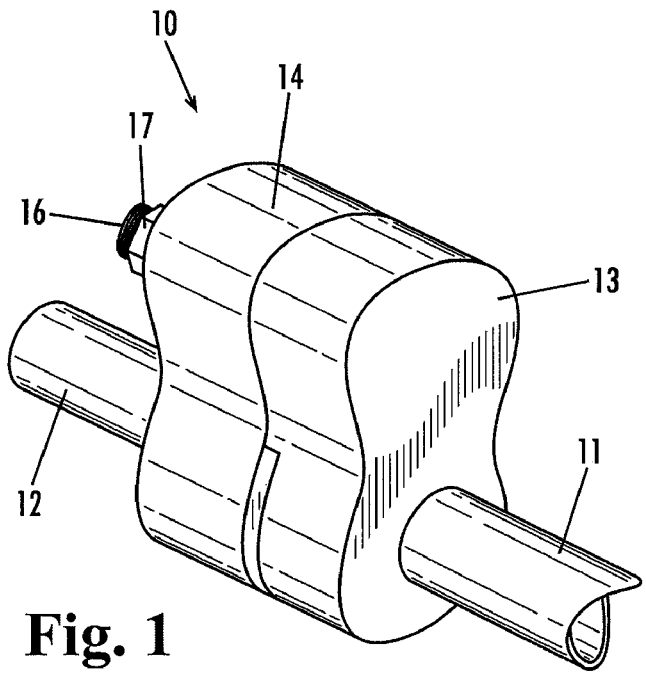
FIG. 1 is a perspective illustration of a typical aluminum tube coupler used to couple tubing together in automotive air conditioning systems.

Referring now in more detail to the drawings, wherein like numerals refer where appropriate to like parts throughout the several views, FIG. 1 illustrates a typical aluminum tubing coupler used in automotive air conditioning systems to couple the ends of aluminum refrigerant tubing together. The precise configuration of the coupler of FIG. 1 is common in General Motors vehicles, although similar couplers may be found on other makes of automobiles, such as Ford and Chrysler. These types of couplers might be used, for instance, to couple a condenser unit or radiator in the refrigerant line. Because of the locations of such elements of the air conditioning system, the couplers may and often are located in regions of the engine compartment that are cramped or that have very little additional space. For example, couplers typically are located within the fan cowling or in the small space between a condenser unit and the firewall of the vehicle. Thus, traditional in-line filters are not installable at these locations. Further, even if there was enough room for an in-line filter, the inflexibility of the serpentinely configured aluminum tubing of an automotive air conditioning system makes such filters impractical because the tubing can not easily be reconfigured to accommodate their length.

Figure 3:
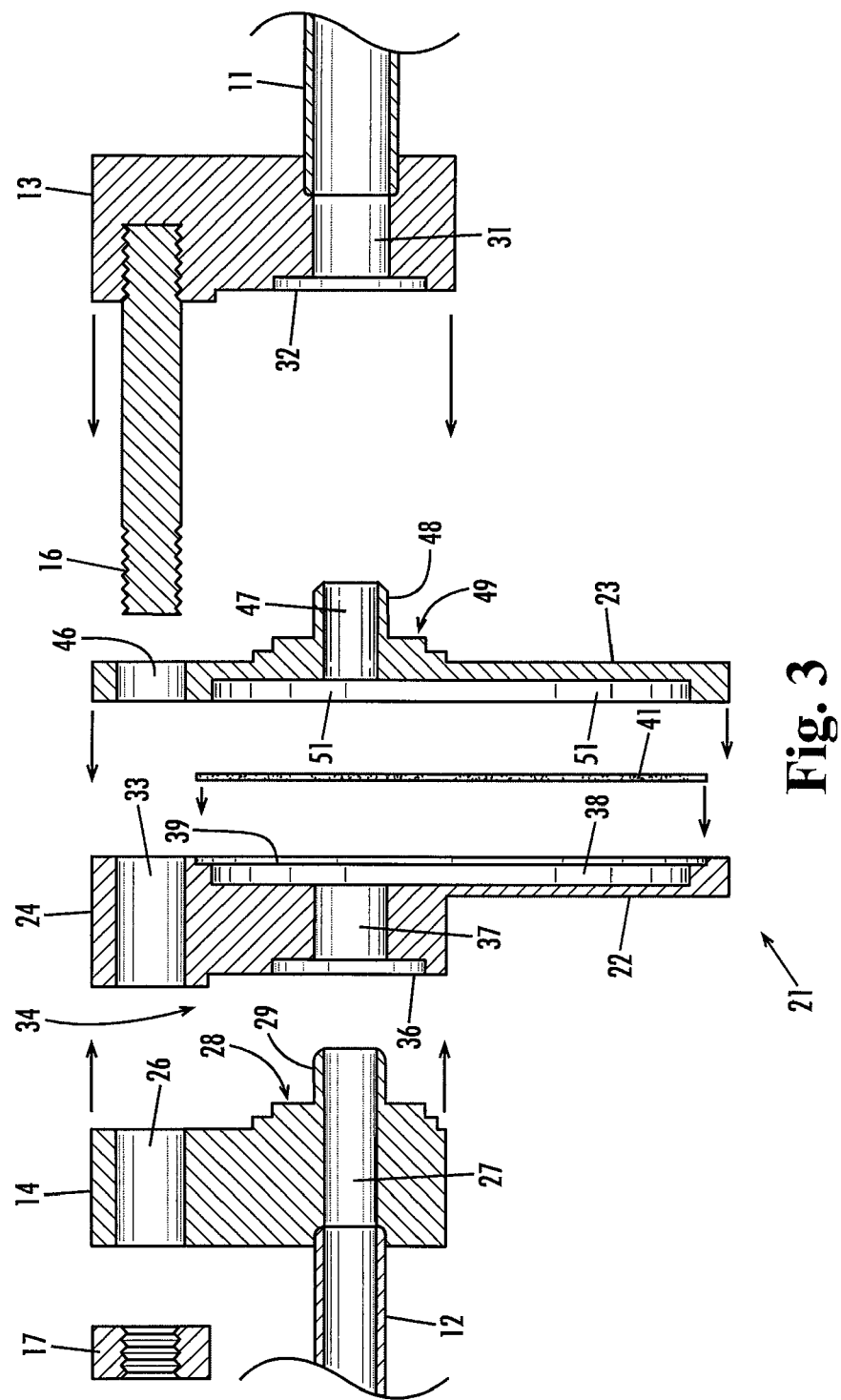
FIG. 3 is an exploded cross sectional view of the filter of FIG. 2 showing how it is installed between the male and female tubing coupler sections to provide filtering in an extremely tight space.
Figure 4:
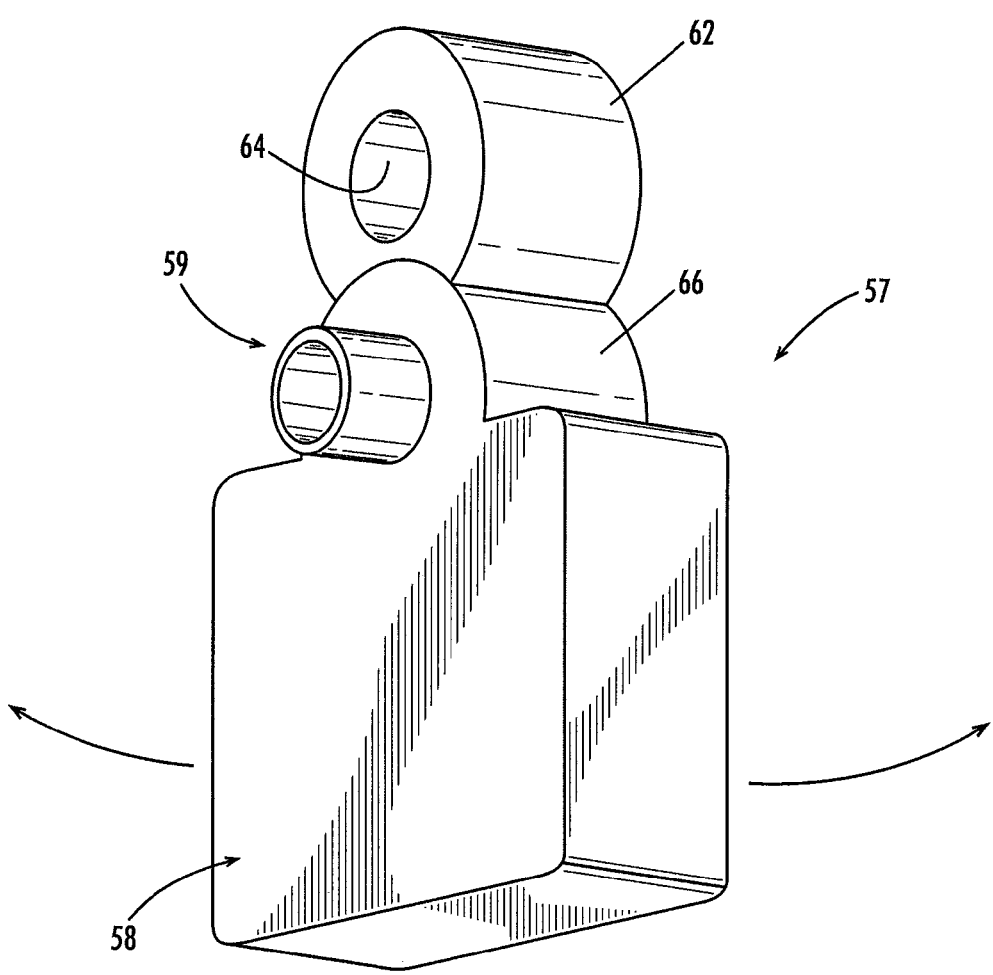
FIG. 4 is a perspective view of an alternate embodiment of a thin profile filter according to the present invention.

Referring to FIG. 1, the tubing coupler 10 sealingly couples together the ends of two aluminum refrigerant tubes 11 and 12 respectively of an automotive air conditioning system. The coupler comprises a male section 14 fixed to the end of tube 12 and a female section 13 fixed to the end of tube 11. The male and female sections are configured to attach together face-to-face as shown in FIG. 1 such that the ends of the tubes 11 and 12 are sealingly coupled together for flow of refrigerant. The sections are held together by a nut 17 that is treaded onto the end of a threaded stud 16, which, as best seen in FIG. 3, is fixed to the female section 13 and extends through a bolt hole in the male section 14 for attachment of the sections of the coupler. It can be seen from FIG. 1 that the coupler 10 is a convenient way to couple the ends of aluminum tubing together in a confined space.

Figure 2:
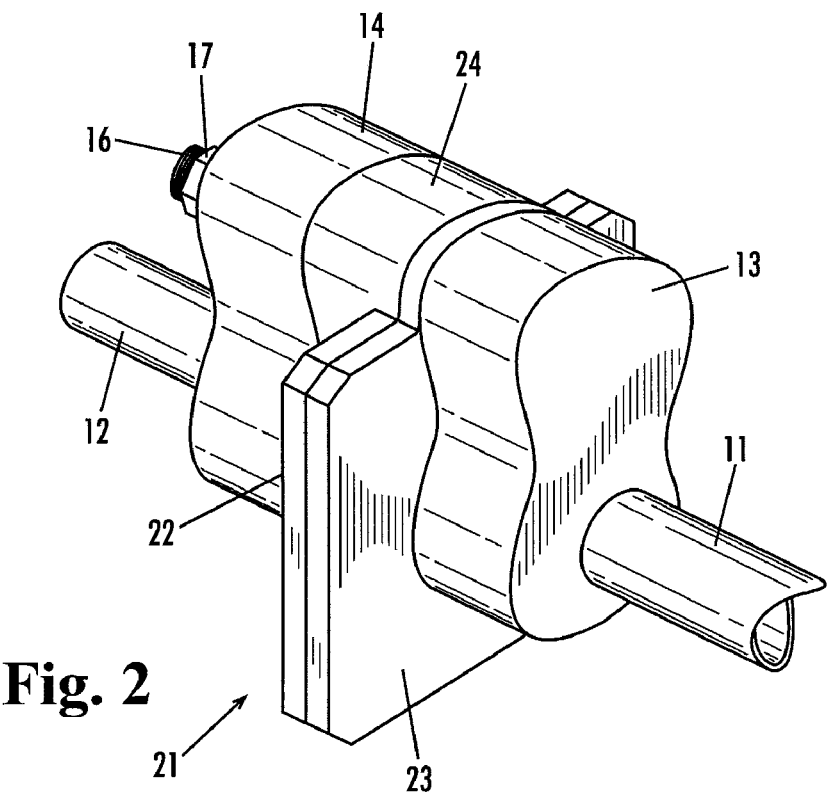
FIG. 2 is a perspective view of one embodiment of a very thin profile filter according to the present invention installed in the coupler of FIG. 1.

FIG. 2 illustrates a tubing coupler such as that shown in FIG. 1 with a very thin profile filter installed therein according to the present invention. To install the filter, the nut 17 is unthreaded from the stud 16 and the male and female sections of the coupler 10 are decoupled and separated. The filter is then inserted between the sections and the sections with filter sandwiched therebetween are attached together by rethreading and tightening the nut 17 onto the treaded stud 16. The filter 21 of this embodiment generally is formed with a thin substantially flat first shell 22 and a thin substantially flat second shell 23 that, when mated together as shown, form a thin generally rectangular filter housing. The fist shell 22 is further formed with a mounting lobe 24 that, in this embodiment, has a profile that substantially matches the profile of the coupler sections, as more fully described below.

The housing of the filter 21 forms a thin rectangular interior chamber within which is mounted a rectangular filter screen or sheet of another appropriate filter medium. The filter screen is substantially sandwiched between the shells of the filter. In this way, refrigerant flowing through the tubes 11 and 12 is constrained to pass through the filter screen, which traps entrained particles within the refrigerant. Because of the relatively large rectangular shape of the filter housing and filter screen, a large surface area of filter media relative to the very small thickness of the filter is presented to the fluid. However, unlike in-line filters, the filter of this invention takes up very little space and does not require any reconfiguration of the aluminum tubing for its installation. It easily fits in existing spaces that are tight or confined.

FIG. 3 is a detailed exploded perspective showing the filter of this embodiment and its installation in a coupler. The male portion 14 of the coupler is seen to have an internal passageway 27 that extends through a projecting nipple 29 that is centrally disposed in concentric circular lands 28. The female section 13 of the coupler has a face that is configured to mate with the face of the male section and receive the nipple 29 for coupling the two tube ends together. More specifically, the inside face of the female section is formed with a recessed circular seat 32 that receives and seals with the land 28 and a passageway 31 that receives and seals with the nipple 29. Threaded stud 16 is fixed in place within the upper portion of the female section 13 and is sized to extend through the bolt hole 26 of the male section 14 for receiving nut 17 that attaches the sections together.

As mentioned above, the filter 21 has a first shell 22 and a second shell 23 that fit together to form the housing of the filter. The first shell 22 is formed with a mounting lobe 24 that has a bolt hole 33 formed through its upper portion. The bolt hole is sized and positioned to align with the bolt hole 26 when the filter is disposed between the sections of the coupler. The first shell 22 is formed with a face 34 that mimics the configuration of the inside face of the female section 13 of the coupler. More specifically, the face 34 is formed with a circular seat 36 that mimics the seat 32 and a passageway 37 that mimics the passageway 31. It will thus be seen that the face 34 of the first shell 22 mates with the inside face of the male section of the coupler in the same way as the inside face of the female coupler in a normal configuration of the coupler. The opposite side of the shell 22 is configured to define a recessed generally rectangular well 38 surrounded by a shallow recessed rim 39. The passageway 37 communicates with the well 38.

A generally rectangular mesh screen 41 is sized to fit within the recessed rim 39 of the first shell 22. The mesh screen preferably has a mesh size sufficiently small such that harmful particulates entrained in a refrigerant flow are trapped as refrigerant passes through the screen. A mesh screen is the preferred filter medium in the present invention; however, it should be understood that any type of filter medium may be substituted for the mesh screen and all such filter media are considered equivalent to the disclosed mesh screen.

The second shell 23 of the filter housing has an inside face formed to define a recessed rectangular well 51 that is substantially the same width and height (although possible a different depth) as the well 38. It will thus be seen that when the screen 41 is disposed in the recess 39 and the shells are joined together, the periphery of the well 51 overlaps the edges of the screen. The screen is thus held firmly in place spanning the interior cavity or chamber formed by the wells of the joined shells. The second shell 23 has an outside face that is configured to mimic the shape of the inside face of the male section 14 of the coupler. More specifically, the second shell is formed with a passageway 47 that extends from the well 51 through a projecting nipple 48. The projecting nipple 48 is disposed in the center of a circular land 49 that has the same size and shape as the land 28. With this configuration, it will be seen that the female section 13 of the coupler can sealingly couple to the outside face of the second shell in the same way that it couples to the male section of the coupler in a normal coupling installation. The second shell 23 is formed with a bolt hole 46 that aligns with the bolt holes 26 and 33.

The filter is assembled by simply installing the mesh screen 41 in the first shell and positioning the second shell over the first shell to form the filter body and capture the screen. The shells can be secured together and sealed by epoxy, welding, a gasket, or other appropriate means. The coupler is then disassembled and the assembled filter is located between the male and female sections of the coupler with its bolt holes aligned with the bolt hole 26 and the threaded stud 16. The sections of the coupler are then brought together until the nipple 29 seats within the passageway 37 and the nipple 48 seats within the passageway 31. Nut 17 is threaded onto the end of threaded stud 16 and tightened to secure and seal the filter 21 in place sandwiched between the coupler sections and in line with refrigerant tubes.

With the filter 21 in place, refrigerant entering from the left, for example, in FIG. 3 encounters the screen 41 as it passes through the filter. The refrigerant is constrained to pass through the screen before moving out through the nipple 48 and is thus filtered and cleansed by the mesh screen. As the portion of the screen in the direct path of the fluid becomes clogged, the refrigerant simply spreads laterally away from this portion to a more peripheral portion of the screen that is not clogged. In fact, such lateral spreading might be deemed beneficial in some applications and, to force such spreading, the central portion of the mesh screen might deliberately be crushed or clogged to cause spreading to occur. In any event, the large surface area of the mesh screen insures that the filter, although exceedingly thin, will function for long periods of time that are comparable to the lifetime of a much larger in-line filters. Eventually, when the filter does become clogged, the entire filter or its mesh screen is easily replaced for continued use.

Figure 5:
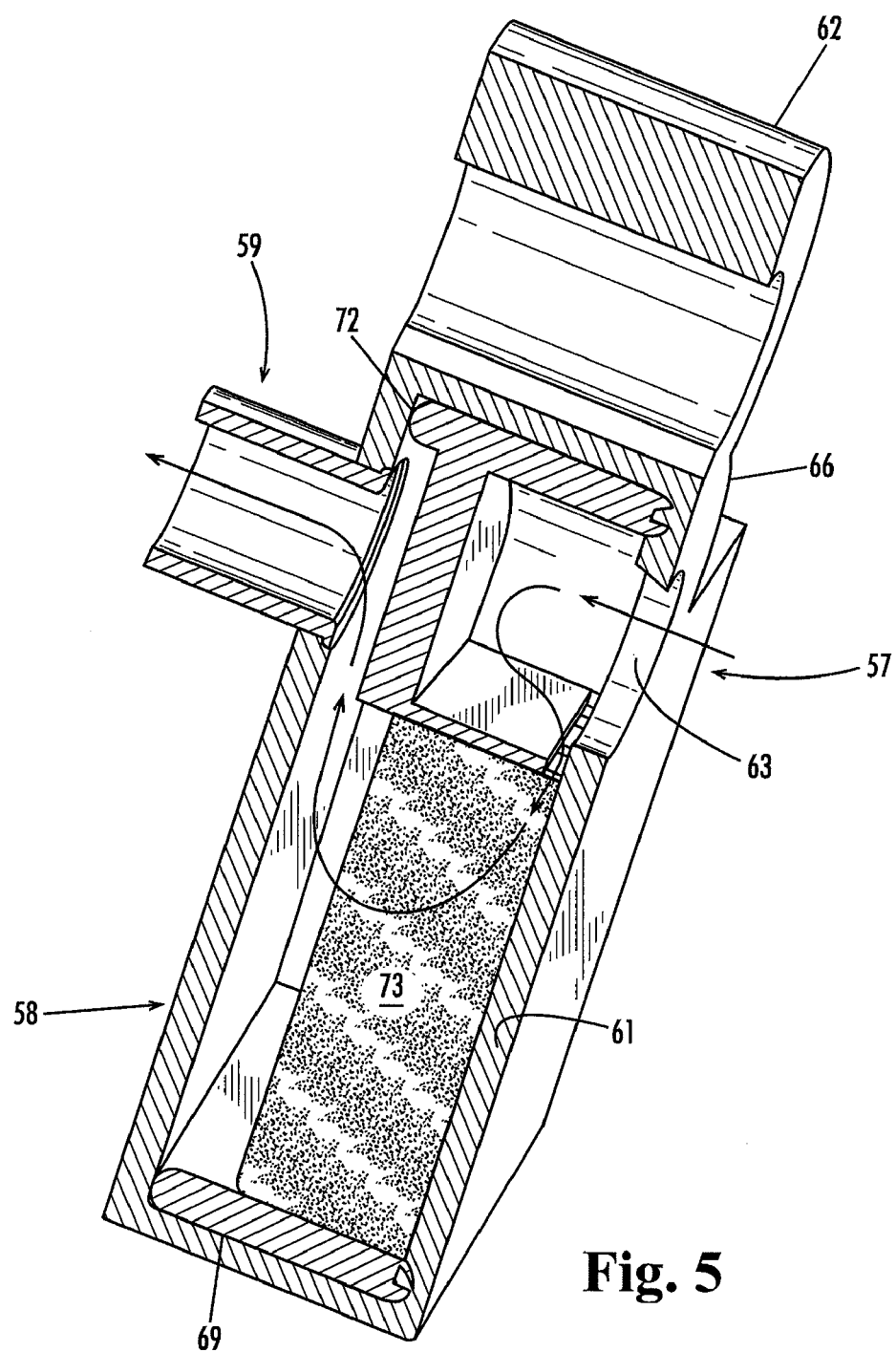
FIG. 5 is a perspective cross-sectional view of the thin profile filter embodiment of FIG. 4.

FIGS. 4-7 illustrate another or alternate embodiment of a thin profile filter according to the present invention that also represents a best mode known to the inventor of carrying out the invention. In these figures, the filter unit 57 comprises a housing or shell 58 having a generally open interior and being closable by a cover plate 61 (FIGS. 5-7). The shell 58 is formed on its upper side with a cylindrical lobe 66, that resides between the male and female sections of a tubing coupler 10 (FIG. 1) when the filter is installed. The cover plate 61 is formed with a corresponding lobe so that when the cover plate 61 is secured to the shell 58 as shown in FIG. 5, the two define an interior space having a generally rectangular lower region with a crescent or lobe-shaped upper region.

As best illustrated in FIGS. 5-7, a filter element 67 is formed with a body 68 having a generally rectangular lower section 69 and a lobe-shaped upper section 71. The upper section 71 includes a fluid dam 72 that normally prevents fluid from flowing directly through the lobe-shaped upper region of the filter element. The rectangular lower section 69 is configured to receive and hold an accordion folded filter medium 73 designed to filter particles from fluid passing therethrough. Further, the body 68 of the filter element 67 preferably is formed of a compliant compressible material such as rubber or a rubberized polymer so that it is flexible and somewhat compressible. In this way, as best seen in FIG. 5, when the filter element is closed within interior of the filter body 68, the peripheral edges of the filter body 68 engage and seal around the periphery of the interior regions of the filter housing, including the rectangular lower region and the lobe-shaped upper region, as shown.

A mounting boss 62 having bolt hole 64 is provided for mounting the filter of FIGS. 4-7 between the male and female halves of a tubing coupler 10 (FIG. 1). Unlike in prior embodiments, the mounting boss 62 of this embodiment is separate from the body of the filter and is configured with a crescent-shaped recess so that the cylindrical boss 62 can be nested atop the mounting lobe 66 of the filter body. When so nested, the filter body can be swung in an arc, as illustrated by the directional arrows in FIG. 4, with the mounting lobe 66 rotatably sliding within the recess of the mounting boss 62.

To mount the filter of this embodiment inline with a tubing coupler of the type shown in FIG. 1, the tubing coupler is decoupled by removing its nut and separating the male and female halves of the coupler. The filter 57 is then positioned between the separated halves, which are then brought together until they capture and sandwich the mounting boss and upper portion of the filter body. More specifically, as the halves of the coupler are brought together, the mounting bolt on one of the halves of the coupler advances through the bolt hole 64 in the mounting boss 62. At the same time, the nipple 29 (FIG. 3) on the male half of the coupling advances into the inlet port 63 of the filter housing and the outlet nipple 59 of the filter advances into the passageway 31 (FIG. 3) in the female half of the coupling. During this process, and before tightening of the nut 17 on the bolt 16, the body of the filter 57 can be rotated with respect to the mounting boss 62 so that it fits in the available space and is out of the way. Appropriate seats and seals (not shown) are provided as is known in the art so that a fluid-tight seal is formed between the male and female halves of the fluid coupling and the body of the filter 57. Finally, the nut 17 is tightened on the bolt 16 to clamp and seal the mounting boss 62 and filter 57 tightly between the male and female halves of the tubing coupler 10.

With the filter 57 of this embodiment installed, the air conditioning system can be re-charged with refrigerant and operated in the normal way, which causes the refrigerant to circulate within the tubing of the air conditioning system. As illustrated by flow arrows in FIG. 5, as the refrigerant approaches the newly installed filter of this invention, it enters the filter body through the inlet port 63 into which the nipple of the tubing coupler extends. Instead of moving straight trough, however, the refrigerant encounters the fluid dam 72, which forces the refrigerant to flow downwardly and through the filter medium 73 carried by the lower portion of the filter body 68. Thus, small particulate matter entrained within the refrigerant flow are captured by the filter medium and removed from the flow. The filtered and cleansed refrigerant then passes upwardly on the other side of the filter element and is directed out through the outlet nipple 59, from where it continues its circulation through the air conditioning system. Of course, the direction of circulation can be opposite from that described here with the same results. Each time the refrigerant traverses the filter, it is filtered and cleansed.

At predetermined service intervals, the filter of this embodiment should be replaced, which, with the mounting boss arrangement, is a simple matter. The nut 17 is merely loosened and the halves of the coupler separated slightly until the filter body can be slipped from between the coupler halves. The mounting boss, in contrast, stays in place. The cover plate 61 can then be removed, which allows the filter element 67 to be removed and replaced with a fresh filter element. The filter is then re-installed as described above for continued use.

In the event that the filter becomes clogged and is not replaced as scheduled, the filter of this embodiment provides a bypass mechanism that will allow the refrigerant to continue to flow and avoid damage to the air conditioning system. More specifically, in the event that the filter medium becomes too clogged for efficient passage of refrigerant therethrough, a natural backpressure develops on the inlet side of the filter. The fluid dam 72 is carefully designed such that backpressure above a preselected threshold causes the dam to rupture or break, which allows refrigerant to flow directly through the upper portion of the filter and continue to circulate, albeit unfiltered. To accomplish this, the dam can be formed with a carefully engineered thickness, with a thin region engineered to rupture under pressure, with a set of scores that rupture in a controlled manner, or in any of a number of other ways to insure that the fluid dam ruptures when backpressure exceeds the threshold.

The invention has been described herein in terms of preferred embodiments and methodologies. It will be understood by those of skill in the art, however, that various modifications to the illustrated embodiments might be made by those of skill in the art, all within the scope of the invention. For instance, the filter has been illustrated with a generally rectangular shape. However, other shapes such as round or triangular are possible and all shapes are contemplated to be within the scope of the invention. Any appropriate type of filter media might be substituted for the mesh screen of the first preferred embodiment and the particular configurations of the faces of the filter are, of course, dependent upon the configuration of the particular coupler in which the filter is to be installed. Generally, the faces of the filter mimic the faces of the coupler sections so that the filter can be sandwiched and installed between the coupler sections. The housing of the filter preferably is formed of metal; however, it also might be formed of plastic or other durable resilient material, with comparable results. Finally, the filter of this invention has been illustrated for use with automotive air conditioning systems, for which it initially was designed. However, the concept is adaptable to any system, such as, for instance, a power steering fluid circuit, where a flowing fluid can benefit from continuous filtering. These and other modifications, additions, and deletions might well be made by those of skill in the art without departing from the spirit and scope of the invention as set forth in the claims.

What is claimed is:

1. A automotive air conditioning refrigerant filter for sandwiching between male and female sections of a tubing coupler, said filter comprising:
   a first substantially planar shell having an inside face formed with a first well;
   a second substantially planar shell having an inside face formed with a second well;
   said first shell and said second shell being configured to be joined together inside-face-to-inside-face with said first and second wells defining an internal cavity with a substantially uniform width throughout its extent;
   a sheet of filter media disposed in and spanning said internal cavity and having a central region;
   a fluid inlet on one of said shells communicating with said internal cavity on one side of said sheet of filter media, said fluid inlet being displaced from said central region of said sheet of filter media;
   a fluid outlet on the other one of said shells communicating with said internal cavity on the other side of said sheet of filter media, said fluid outlet being displaced from said central region of said sheet of filter media and being substantially aligned with said fluid inlet; and
   a mounting lobe on a peripheral portion of said first and second shells for mounting said filter between the male and female sections of the tubing coupler
   fluid entering said internal cavity through said fluid inlet being constrained to pass through said sheet of filter media for filtering prior to exiting through said fluid outlet.

2. A filter as claimed in claim 1 and wherein said first and second shells are substantially rectangular.

3. A filter as claimed in claim 2 and wherein said first and second wells are substantially rectangular.

4. A filter as claimed in claim 1 and wherein said sheet of filter media comprises a mesh screen.

5. A filter as claimed in claim 4 and wherein said mesh screen is substantially planar.

6. A filter as claimed in claim 1 and further comprising a recessed rim formed around the periphery of one of said wells, said sheet of filter media being sized to fit within said recessed rim for holding said sheet in place when said first and second shells are joined together.

7. A filter as claimed in claim 1 and wherein said first and second shells are made of metal.

8. A filter as claimed in claim 1 and wherein said fluid inlet and said fluid outlet are configured to mate with a corresponding section of the tubing coupler.

9. A thin profile filter for mounting between first and second coupler sections of a coupler that normally couples respective ends of fluid flow tubes together, said filter comprising:
   a first relatively thin substantially planar shell having one face having a fluid inlet configured to mate with said first coupler section and an opposite face formed to define a first relatively shallow well;
   a second relatively thin substantially planar shell having one face having a fluid outlet configured to mate with said second coupler section and an opposite face formed to define a second relatively shallow well;
   said first and second shells being configured to join together well-to-well to form a filter housing when said shells are sandwiched between said coupler sections, said wells defining an interior chamber having a central region and a substantially uniform width throughout its extent within said filter housing;
   said fluid inlet and said fluid outlet being substantially aligned with each other and being displaced from said central region of said interior chamber; and
   a sheet of filter media disposed in and substantially spanning said interior chamber;
   fluid flowing through said fluid flow tubes passing through said interior chamber and through said sheet of filter media to filter the fluid.

10. A thin profile filter as claimed in claim 9 and wherein said shells are substantially rectangular.

11. A thin profile filter as claimed in claim 10 and wherein said wells are substantially rectangular.

12. A thin profile filter as claimed in claim 9 and further comprising a recessed rim around one of said wells for receiving and holding said sheet of filter media.

13. A thin profile filter as claimed in claim 9 and wherein said sheet of filter media comprises a mesh screen.

14. A thin profile filter for being sandwiched between coupler sections of a tubing coupler that normally couples corresponding ends of fluid flow tubes together, said filter for filtering fluid flowing through said tubes, and comprising:
   a relatively thin substantially planar filter housing having opposed faces and defining a relatively thin interior chamber having a substantially uniform width throughout its extent, a central region, and a peripheral region;
   a sheet of filter media disposed in and spanning said relatively thin interior chamber;
   one of said opposed faces being configured to couple to one of said coupler sections with the corresponding tube end communicating with a peripheral region of said interior chamber on one side of said sheet of filter media;
   the other of said opposed faces being configured to couple to the other one of said coupler sections with the corresponding tube end communicating with the same peripheral region of said interior chamber on the other side of said sheet of filter media.

15. The filter of claim 14 and wherein said relatively thin substantially flat filter housing is substantially rectangular in shape.

16. The filter of claim 14 and wherein said sheet of filter media comprises a mesh screen.

17. The filter of claim 14 and wherein said housing is formed by a pair of shells having wells formed on their inside faces, said shells being joined together well-to-well with said wells defining said interior chamber of said housing.

18. A thin profile filter shaped and sized to be sandwiched between coupler sections of a tubing coupler that normally couples corresponding ends of fluid flow tubes together, said filter comprising:

a relatively thin filter housing having a substantially uniform thickness, said filter housing having opposed outer faces and defining an interior chamber;

filter media disposed in said interior chamber;

one of said opposed faces being configured to couple to one of said coupler sections with the corresponding tube end communicating with a peripheral region of said interior chamber on one side of said filter media;

the other of said opposed faces being configured to couple to the other one of said coupler sections with the corresponding tube end communicating with the same peripheral region of said interior chamber on the other side of said filter media.

19. A thin profile filter as claimed in claim 18 and wherein said filter housing is formed with a lobe in the peripheral region of said interior chamber where coupling to the coupler sections occurs, the fluid moving generally transversely from said lobe to pass through said filter media and then back to said lobe to exit said filter.

20. A thin profile filter as claimed in claim 19 and further comprising a mounting boss for rotatably mounting said filter between the coupler sections.

21. A thin profile filter configured to be sandwiched between sections of a tubing coupler and being selectively positionable relative to said tubing coupler to adapt to and fit in a confined space in the vicinity of the tubing coupler said filter comprising a relatively thin substantially planar body having an inlet on one side and an outlet on an opposite side, the inlet being aligned with the outlet and the inlet and outlet being located at a peripheral region of said body such that said body, when sandwiched between sections of a tubing coupler, projects radially away from the coupler, said filter body carrying filter media.

* * * * *